Sept. 13, 1966    M. BAERMANN    3,273,001
PERMANENT MAGNET DEVICE FOR GENERATING ELECTRICAL ENERGY
Filed June 1, 1965    2 Sheets-Sheet 1

INVENTOR.
MAX BAERMANN
BY Tilberry & Body
ATTORNEYS

Sept. 13, 1966  M. BAERMANN  3,273,001
PERMANENT MAGNET DEVICE FOR GENERATING ELECTRICAL ENERGY
Filed June 1, 1965  2 Sheets-Sheet 2
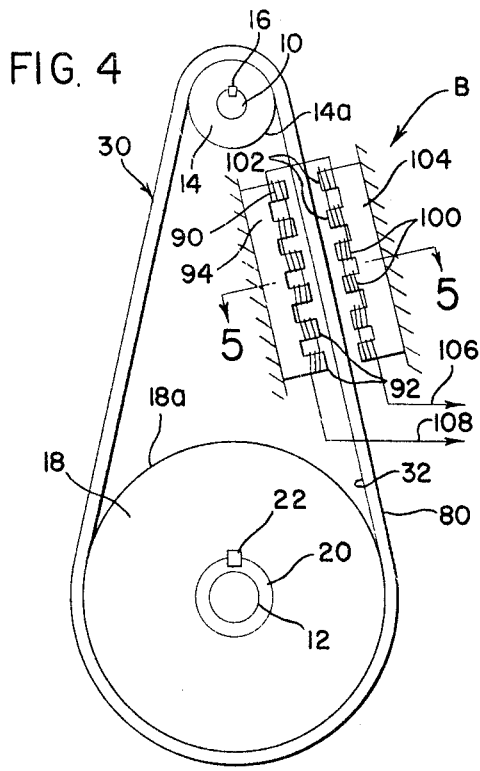
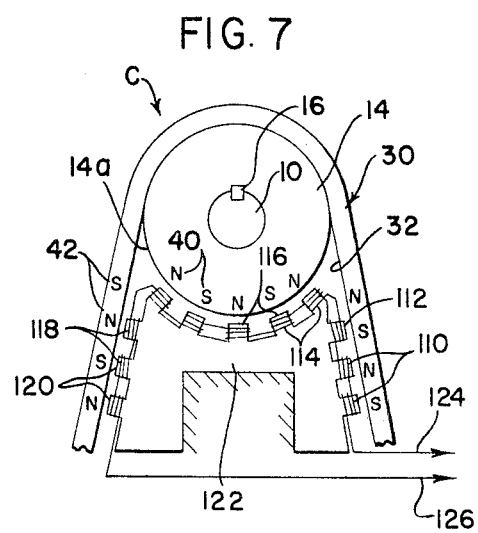
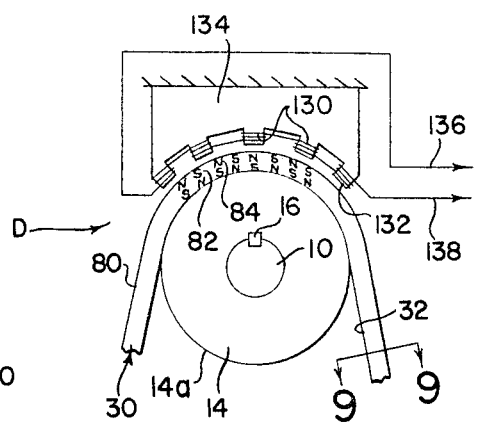
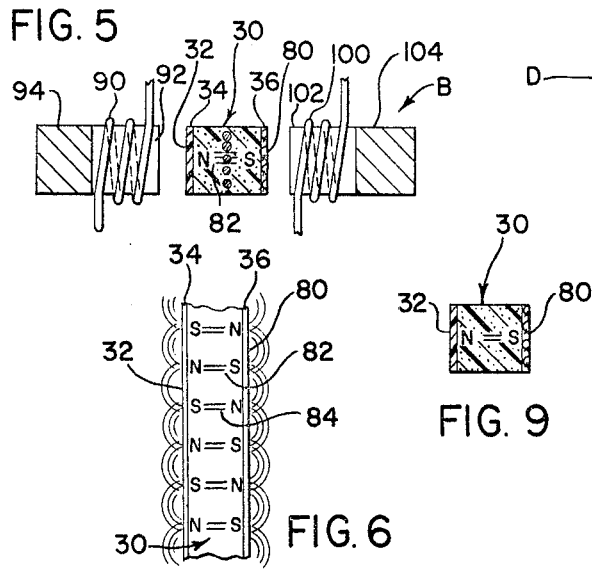
INVENTOR.
MAX BAERMANN
BY *Tilberry & Body*
ATTORNEYS United States Patent Office 3,273,001
Patented Sept. 13, 1966

3,273,001
PERMANENT MAGNET DEVICE FOR GENERATING ELECTRICAL ENERGY
Max Baermann, Bensberg, Wulfshof,
Bezirk Cologne, Germany
Filed June 1, 1965, Ser. No. 460,203
10 Claims. (Cl. 310—152)

The present application is a continuation-in-part application of my copending patent application Serial No. 248,126, filed Dec. 28, 1962, now Patent No. 3,208,296.

This invention pertains to the art of generating electrical energy and, more particularly, to a permanent magent device for generating electrical energy.

The invention is particularly applicable for use in an internal combustion engine as a device for both driving the cam shaft of the engine and generating electrical energy to be used by the engine and it will be described with particular reference thereto; however, it will be appreciated that the invention has much broader applications and may be used in other environments wherein combined driving and energy generating functions are required.

An internal combustion engine generally includes a rotating crankshaft that is drivingly coupled onto a cam shaft by a device known as a timing chain. The crankshaft also drives a generator which generates electrical energy used by the electrical components associated with the engine. Consequently, the crankshaft has a combined function of driving the remotely located cam shaft and generating electrical energy. The normally used generator is a relatively expensive and complex item which increases the cost of the engine and increases the noise level and maintenance difficulties experienced during the general operation of the engine. The timing chain connecting the crankshaft and cam shaft is somewhat expensive and also increases the noise level and maintenance of the engine.

These and other disadvantages of the prior arrangement for driving the cam shaft and the rotary generator are completely overcome by the present invention which is directed toward a permanent magnet device which combines the driving and generating functions in a single unit.

In my copending application mentioned above, there is disclosed a device for drivingly connecting two rotary members. This device includes a flexible belt with spaced, permanent magnet poles. In accordance with the present invention this same type of flexible, permanent magnet belt is used to generate electrical energy while it is also being used as a driving mechanism. This is accomplished by using the flexible drive belt itself as a primary component of a generator positioned adjacent the normal path followed by the drive belt. By this construction, the only moving part in the generator is the flexible, permanent magnet drive belt.

In accordance with the present invention, there is provided a device for generating electrical energy within an internal combustion engine or a similar mechanism, which device comprises: a flexible belt drivingly coupling the cam shaft or a driven element of the engine onto the crankshaft or a driving element of the engine, the belt following a preselected path and having a plurality of longitudinally spaced, alternate north and south magnetic poles adjacent at least one surface of the belt with magnetic lines of force extending between adjacent poles and outward from the surface, an electrical conductor means mounted adjacent the path and opposite the one surface of a belt with the lines of force intersecting the conductor means as the belt travels past the means whereby electrical energy is generated within the electrical conductor means.

The primary object of the present invention is the provision of an electrical generating device which is economical to produce, is durable in operation and relatively few moving parts.

Another object of the present invention is the provision of an electrical generating device which includes a flexible belt having longitudinally spaced magnetic poles, means for moving the belt longitudinally and an electrical coil or conductor means adjacent the belt for generating electrical energy as the belt moves past the coil or conductor means.

Another object of the present invention is the provision of a device which combines the functions of drivingly connecting two rotatable members and of generating electrical energy, which device has, as its essential element, a flexible, permanent magnet belt.

These and other objects and advantages will become apparent from the following description used to illustrate the preferred embodiments of the invention as read in connection with the accompanying drawings in which:

FIGURE 4 is a front elevational, schematic view illustrating a modification of the preferred embodiment of the invention, as illustrated in FIGURE 1;

FIGURE 5 is an enlarged, cross-sectional view taken generally along line 5—5 of FIGURE 4;

FIGURE 6 is a partial, side view illustrating an aspect of the embodiment of the invention shown in FIGURE 5;

FIGURE 7 is a partial, front elevational, schematic view illustrating a further embodiment of the present invention;

FIGURE 8 is a partial, front elevational, schematic view illustrating still a further embodiment of the present invention;

FIGURE 9 is an enlarged, cross-sectional view taken generally along line 9—9 of FIGURE 8; and, FIGURE 10 is an enlarged, cross-sectional view illustrating a further embodiment of the present invention.

Figure 1:
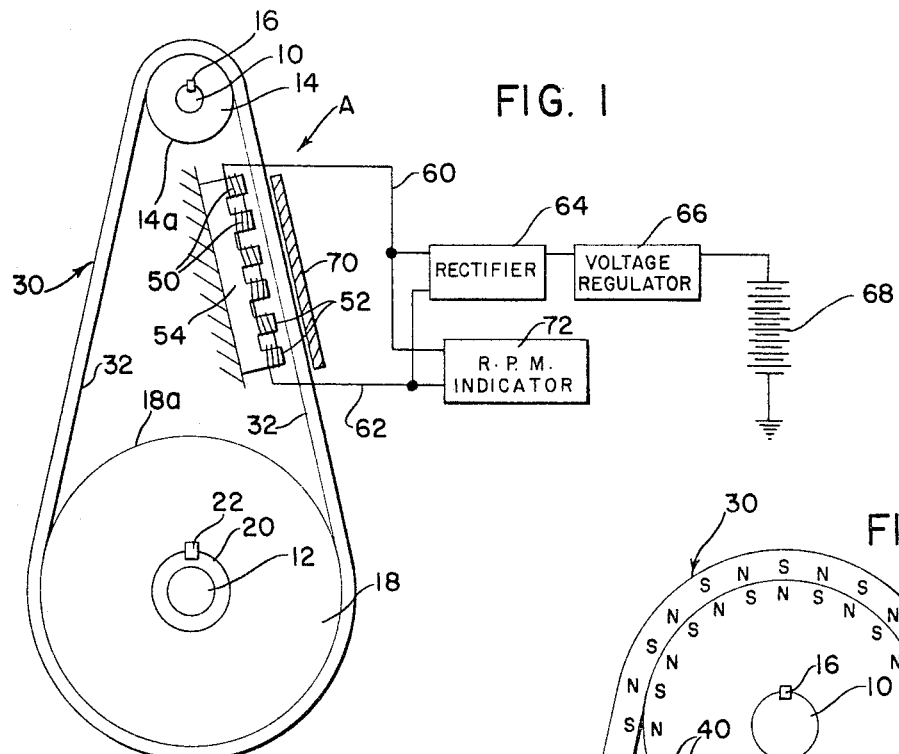
FIGURE 1 is a front elevational, schematic view illustrating a preferred embodiment of the present invention.

Referring now to the drawings wherein the showings are for the purpose of illustrating preferred embodiments of the invention only and not for the purpose of limiting same, FIGURE 1 shows a cam shaft 10 and a crankshaft 12 of a conventional internal combustion engine, not shown. A drum 14 having an outer peripheral, driving surface 14a is secured onto cam shaft 10 by a key 16. In like manner, a drum 18 having an outer peripheral, driving surface 18a is secured onto an angular adjutable ring 20 by a key 22. In accordance with the illustrated embodiment of the invention, the ring 20 is appropriately secured onto the crankshaft 12 by a mechanism (not shown) which will allow angular adjustment between the ring and the crankshaft. This mechanism may take a variety of forms, such as elongated slots used with a plurality of anchor bolts.

Crankshaft 12 is drivingly connected onto cam shaft 10 by a belt 30 which is provided with a plurality of longitudinally spaced, alternate north and south magnetic poles, in a manner to be hereinafter described in detail. Although the belt could take a variety of structural forms, in accordance with the preferred embodiment of the invention, the belt 10 is formed from a flexible permanent magnet material, which material includes a flexible non-magnetic matrix having finely divided permanently magnetizable particles dispersed therein. The permanently magnetizable material should have a high coercive field strength of more than 1,000 oersteds and a low permeability. The iron ferrites with one or more of the metallic oxides of barium, strontium or lead, are especially adapted for use as the finely divided, permanently magnetizable material; however, it is appreciated that other permanent magnet materials having similar magnetic properties may be used. One of these other permanent magnet materials is bismuth-manganese.

In accordance with the illustrated embodiment of the invention, the belt 30 includes an inner driving surface 32 adapted to be entrained around driving surfaces 14a, 18a of the drums 14, 18, respectively. A wear resistant layer 34 is secured onto the driving surface 32 to increase the life of the belt. This wear resistant layer may take a variety of forms and it may be adhered directly onto the flexible permanent magnet material of the belt. Within the body of the belt there are provided a plurality of longitudinally extending reinforcing strands 36, which have a modulus of elasticity substantially greater than the modulus of elasticity of the material forming the belt. These strands increase the tensile characteristics of the belt and prevent elongation during use. An outer layer 38 of fabric material, or other such material, may be provided on the belt 30 to further increase the tensile characteristics of the belt to prevent elongation of the belt during use.

Figure 3:
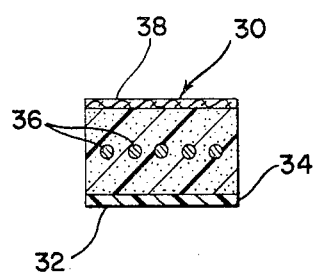
FIGURE 3 is an enlarged, cross-sectional view taken generally along line 3—3 of FIGURE 2.

The surfaces 14a, 18a of the drums are each provided with a set of permanent magnet poles 40, which poles are alternately north and south magnetic poles and are spaced circumferentially around these surfaces. FIGURE 3 shows the set of poles on drum 14; however, it is to be appreciated that a similar set of poles is provided on drum 18. The drums are formed from any of a variety of permanently magnetizable materials to provide the north and south magnetic poles along the driving surface. A number of these drum constructions are illustrated in my copending application, Serial No. 248,126, filed Dec. 28, 1962. Along the inner driving surface 32 of belt 30 there is provided a set 42 of permanent magnet poles which have alternate magnetic polarity and are longitudinally spaced along the belt. The spacing between the poles on drums 14, 18 and the spacing between the poles on belt 30 are substantially equal so that a magnetic pole on the belt will be attracted to an opposite polarity magnetic pole on the drums to provide a positive driving connection between the belt and the drums.

By constructing the belt 30 from high coercivity, low permeability, permanent magnet particles dispersed through and embedded within a flexible binder, the surface 32 of the belt may be magnetized with closely adjacent opposite polarity poles without the difficulty of magnetic shorting between adjacent poles. High coercivity and low permeability material allows the magnetic lines of force between adjacent poles to extend outwardly from surface 32 instead of extending through the material itself between the adjacent poles. This provides a high flux density exterior of the belt which high flux density increases the tenacity by which the belt is attracted to the driving surfaces 14a, 18a.

Figure 2:
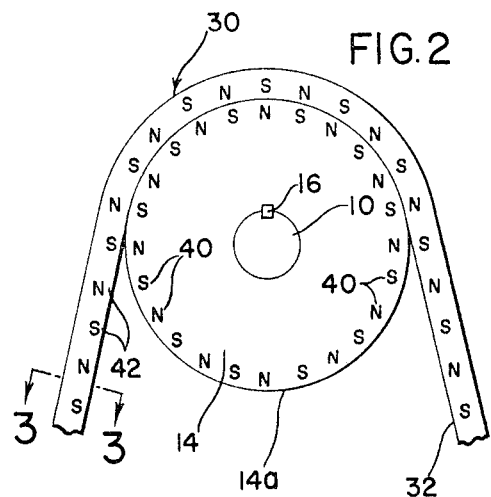
FIGURE 2 is an enlarged, partial view illustrating a portion of a preferred embodiment of the invention shown in FIGURE 1.

As so far described, the embodiment of the invention shown in FIGURES 1–3 does not differ substantially from the invention disclosed in my above-mentioned copending application. In accordance with the present invention, there is provided a device A for generating electrical energy. This device A includes a plurality of coils 50 formed from electrically conductive wire wrapped around pole shoes 52. A plurality of these coils 50 are spaced longitudinally along the path followed by belt 30 and the coils are spaced only slightly from the driving surface 32. As the belt 30 passes the longitudinally spaced coils 50, the magnetic lines of force extending from surface 32 intersect the turns of the coils to generate electrical energy within these respective coils. In accordance with the illustrated embodiment of the invention, each of the pole shoes 52 is mounted onto a common magnetic core 54 so that the coils 50 can be easily assembled onto a single support element.

By properly connecting the coils 50, the electrical energy generated within the respective coils can be added and the total energy is directed through output leads 60, 62. This electrical energy may be utilized for various purposes; however, in accordance with the illustrated embodiment of the invention, the output leads 60, 62 are connected onto the input of a rectifier 64 so that the output of the rectifier is a D.C. voltage. When this apparatus is utilized in a motor vehicle, this D.C. voltage may be passed through a voltage regulator 66 to a wet cell storage battery 68 so that the electrical energy may be stored within the battery for subsequent use. It should be appreciated that electrical energy generated by device A can be utilized, either rectified or unrectified, for a number of purposes.

As the magnetic lines of force intersect the coils 50, there may be a tendency for the belt 30 to be forced away from the pole shoes 52; therefore, in accordance with the illustrated embodiment of the invention, there is provided a backing plate 70 formed from a non-magnetic material which maintains the surface 32 of belt 30 in close proximity with the electrical coils 50 as the belt 30 passes thereby.

In accordance with the illustrated embodiment of the invention, the device A is utilized within an internal combustion engine. In such an apparatus, it is often advisable to measure the rotary speed of the engine. The device A is well adapted for furnishing this information. For instance, an r.p.m. indicator 72 could be provided across leads 60, 62 with the indicator being responsive to the frequency of the voltage across these leads, or the effective voltage across these leads. Either of these values could provide, upon proper calibrations, a relatively accurate indication of the rotational speed of either cam shaft 10 or crankshaft 12.

A modification of the preferred embodiment of the invention is illustrated in FIGURES 4–6 wherein device B is utilized for generating electrical energy. In accordance with this embodiment of the invention, the belt 30 is magnetized to present magnetic poles on the outer, non-driving surface 80, as is shown in FIGURES 5 and 6. To accomplish this, belt 30 is magnetized with pairs of transversely extending magnetic poles 82, 84 spaced longitudinally along the length of the belt. These pairs of magnetic poles produce alternate north and south magnetic poles on both the surface 32 and the surface 80. It is appreciated that various magnetization patterns could be utilized for providing the magnetic poles on the driving surface 32 and the non-driving surface 80.

Device B includes a plurality of electrical coils 90, similar to coils 50 shown in FIGURE 1. These coils are supported on pole pieces 92 which are spaced longitudinally along the path followed by surface 32 of belt 30. To provide a unitary structure, the pole pieces are formed on a common magnetic core 94. In a like manner, a plurality of electric pole coils 100 are provided on pole pieces 102, which extend longitudinally along the path followed by the non-driving surface 80. The pole pieces 102 are supported on a common core 104 to provide a unitary structure, as previously described. By appropriately connecting the coils 90 and coils 100 in electrical series, the electrical energy created within each of these coils can be added and imposed across output leads 106, 108. It is appreciated that the general operation of this device B does not differ substantially from the operation of device A, shown in FIGURES 1–3.

Still a further embodiment of the invention is illustrated in FIGURE 7, wherein device C utilizes a belt 30 magnetized in a manner similar to belt 30 in FIG- URES 1-3. In accordance with this embodiment of the invention, a plurality of coils 110 are supported on pole pieces 112 spaced longitudinally along the surface 32 of belt 30 at one side of drum 14. At the other side of drum 14 there are provided a plurality of electrical coils 114 supported on pole pieces 116 which are spaced longitudinally along surface 32 of the belt 30. The coils 110, 118 generate electrical energy as these coils are intersected by the lines of force extending between the magnetic poles in pole set 42, in a manner similar to the operation of the electrical coils in devices A and B. This embodiment of the invention aso utilizes the pole set 40 on cylindrical surface 14a of drum 14 to generate electrical energy. A plurality of coils 118 are supported on pole pieces 120 which are spaced circumferentially around the path followed by surface 14a as the drum 14 rotates. Magnetic lines of force extending between the poles in set 40 intersect the coils 118 and generate electrical energy within these coils in a manner similar to the generation of electrical energy within coils 110, 114. By appropriately connecting the coils 110, 114, 118 in electrical series, the energy created within each of these coils can be added and imposed across output leads 124, 126 so that a substantial amount of electrical energy is provided by the plurality of coils in device C. The general operation of this device does not differ substantially from the operation of the devices previously described.

Yet another embodiment of the invention is disclosed in FIGURES 8 and 9. In this embodiment, device D utilizes a belt 30 magnetized in accordance with the procedure outlined in connection with the embodiment of the invention shown in FIGURES 4–6. The magnetic poles provided on non-driving surface 80 of belt 30 produce outwardly extending magnetic lines of force, which intersect a plurality of coils 130 supported on pole pieces 132 which are spaced longitudinally along the path followed by belt 30. Consequently, the pole pieces 132 are formed on an arcuate path instead of a straight path as illustrated in previous embodiments. Pole pieces 132 are provided on a common core 134 so that they may be mounted as a unit adjacent the surface 80. In accordance with this embodiment of the invention, the coils 130 are electrically connected in series so that the energy created within the coils is added and imposed across output leads 136, 138. The general operation of this device D does not differ from the general operation of the previously discussed apparatus.

Figure 10:
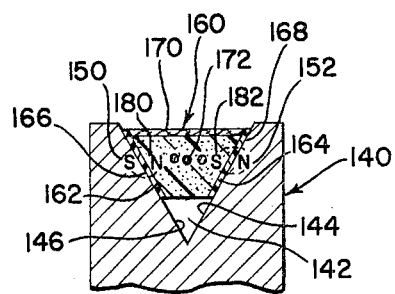

The belt 30 which has been utilized with the apparatus mentioned above, is generally rectangular in cross-section; however, it should be appreciated that the cross-section of the belt may be modified. Referring now to FIGURE 10, a pulley 140 having a V-groove 142 with side walls 144, 146 is provided with pole sets 150, 152 on the oppositely facing side walls. The pulley 140 is adapted to receive a V-belt 160 having longitudinally extending side surfaces 162, 164 with wear resistant layers 166, 168, respectively. These wear resistant layers ride along side walls 144, 146 to provide the contact between the pulley 140 and belt 160. In accordance with the embodiment, belt 160 includes an upper fabric 170 and reinforcing strands 172 to limit the longitudinal stretching of the belt 160 during extended use. Adjacent the side walls 162, 164, belt 160 is provided with sets 180, 182, respectively of magnetic poles with the adjacent poles in each set having opposite polarity and being equally spaced to match the poles in sets 150, 152. The operation of the belt 160 does not differ substantially from the operation of belt 30 with the exception that there are two magnetic driving surfaces connecting the belt with the pulley.

The number of turns of wire in the electrical coils utilized in accordance with this invention may be varied to change the amount of electrical energy generated by the devices herein described. In addition, the number of coils and the spacing of the magnetic poles from the belt or the drums can be varied to change the electrical energy generated by the various embodiments of the invention. All of these modifications are well within the ordinary skill of a man in the permanent art.

The prevent invention has been described in connection with certain structural embodiments; however, it is appreciated that various changes may be made in these embodiments without departing from the intended spirit and scope of the present invention as defined in the appended claims.

Having thus described my invention, I claim:

1. In a device for generating electrical energy, said device comprising: a flexible belt, means for moving said belt longitudinally along a preselected path, said belt having a plurality of alternate north and south magnetic poles longitudinally spaced along one surface of said belt with magnetic lines of force extending outward from said one surface and between said adjacent poles and an electric coil means positioned adjacent said path and opposite said one surface, said lines of force intersecting said coil means as said belt moves past said coil means whereby electrical energy is generated within said coil means, the improvement comprising: said flexible belt drivingly coupling a rotatable driving drum and a rotatable driven drum, said drums each having an outer, peripheral driving surface for receiving said belt, a set of alternate north and south magnetic poles equally spaced in a circumferential direction on said peripheral surfaces, the longitudinal spacing of said poles on said belt being substantially equal to the circumferential spacing of said poles on said drum surfaces and said belt poles being on the surface of said belt contacting said drum surfaces.

2. A device as defined in claim 1 wherein said belt includes a plurality of alternate north and south magnetic poles longitudinally spaced along another surface of said belt with magnetic lines of force extending outward from said other surface and between said adjacent poles on said other surface and a second electric coil means positioned adjacent said path and opposite said other surface, said lines of force which extend from said other surface intersecting said second coil means as said belt moves past said second coil means whereby electrical energy is generated within said second coil means.

3. A device as defined in claim 2 wherein said first mentioned electrical coil means is connected in electrical series with said second electrical coil means with the proper polarity to add the electrical energy within said two coil means.

4. A device as defined in claim 1 including a second electrical coil means, means supporting said second coil means adjacent the peripheral surface of one of said drums, said lines of force which extend from said peripheral surface of said one drum intersecting said second coil means as said peripheral surface of said drum rotates by said second coil means whereby electrical energy is generated within said second coil means.

5. A device as defined in claim 1 wherein said belt is formed from a flexible permanent magnet material and said belt includes longitudinally extending reinforcing strands, said strands having a modulus of elasticity substantially greater than the modulus of elasticity of said flexible permanent magnet material.

6. A device as defined in claim 1 wherein said belt includes a wear resistant layer on the belt surface contacting said drum surfaces.

7. A device for generating electrical energy by an internal combustion engine including a cam shaft and a crankshaft, said device comprising: a flexible belt drivingly coupling said cam shaft onto said crankshaft, said belt following a preselected path and having a plurality of longitudinally spaced alternate north and south magnetic poles adjacent at least one surface of said belt with magnetic lines of force extending between said adjacent poles and outward from said surface, and electrical conductor means mounted adjacent said path and opposite said one surface with said lines of force intersecting said conductor means as said belt travels past said means whereby electrical energy is generated within said electrical conductor means, said cam shaft including a cylindrical drive surface having alternate north and south magnetic poles circumferentially spaced thereon with lines of force extending outwardly from said cylindrical surface and between adjacent poles on said cylindrical surface, said crankshaft including a cylindrical drive surface having alternate north and south magnetic poles circumferentially spaced thereon with lines of force extending outwardly from said cylindrical surface and between adjacent poles on said cylindrical surface, said magnetic poles on said drive belt being positioned on an inner surface of said belt which inner surface drivingly contacts said cylindrical surfaces, said poles on said belt surface and said poles on said cylindrical surfaces having substantially the same spacing.

8. A device as defined in claim 7 including a second electrical coil means, means supporting said second electrical coil means adjacent one of said cylindrical surfaces, said lines of force which extend from said one of said cylindrical surfaces intersecting said second coil means as said one of said cylindrical surfaces rotates by said second coil means whereby electrical energy is generated within said second coil means.

9. A device as defined in claim 7 including means for changing the angular relationship of at least one of said cylindrical surfaces with respect to the shaft onto which said one cylindrical surface is positioned.

10. A device for generating electrical energy by an internal combustion engine including a cam shaft and a crankshaft, said device comprising: a first drum drivingly coupled onto said cam shaft, said first drum having an outer, peripheral surface with a first set of alternate north and south magnetic poles equally spaced circumferentially of said surface, a second drum drivingly coupled onto said crankshaft, said second drum having an outer, peripheral surface with a second set of alternate north and south magnetic poles equally spaced circumferentially of said surface, a flexible permanent magnet belt entrained around said drums and having an internal surface with a third set of alternate north and south magnetic poles equally spaced longitudinally of said surface, the spacing of said poles in said set being substantially equal with magnetic lines of force extending between adjacent poles and outwardly of the respective surfaces, and a fixed electrical conductor means mounted adjacent at least one of said surfaces with said lines of force extending from said one surface intersecting said conductor means as said one surface travels past said means whereby electrical energy is generated within said electrical conductor means.

References Cited by the Examiner
UNITED STATES PATENTS 2,363,336   11/1944   Keeler _____ 310—152 X
3,151,285   9/1964   Rainey _____ 310—152 X ORIS L. RADER, *Primary Examiner.*

G. SIMMONS, *Assistant Examiner.*